US012156309B2

(12) United States Patent
Liu

(10) Patent No.: US 12,156,309 B2
(45) Date of Patent: Nov. 26, 2024

(54) METHOD OF DISPLAYING LIGHT WITH THE RHYTHM OF MUSIC

(71) Applicant: AMERICAN FUTURE TECHNOLOGY, City of Industry, CA (US)

(72) Inventor: You-Chi Liu, City of Industry, CA (US)

(73) Assignee: AMERICAN FUTURE TECHNOLOGY, City of Industry, CA (US)

( * ) Notice: Subject to any disclaimer, the term of this patent is extended or adjusted under 35 U.S.C. 154(b) by 211 days.

(21) Appl. No.: 17/855,342

(22) Filed: Jun. 30, 2022

(65) Prior Publication Data

US 2024/0008154 A1 Jan. 4, 2024

(51) Int. Cl.
*H05B 47/105* (2020.01)
*G10H 1/00* (2006.01)

(52) U.S. Cl.
CPC ......... *H05B 47/105* (2020.01); *G10H 1/0008* (2013.01); *G10H 2210/061* (2013.01); *G10H 2210/071* (2013.01); *G10H 2210/076* (2013.01); *G10H 2250/235* (2013.01)

(58) Field of Classification Search
None
See application file for complete search history.

(56) References Cited

U.S. PATENT DOCUMENTS 5,005,459 A * 4/1991 Adachi .................. G10H 1/368 84/478
2008/0143751 A1 * 6/2008 Chosokabe ............. G06F 16/64 345/654
2019/0090328 A1 * 3/2019 Sakagami ................. A63J 5/02
2021/0203917 A1 * 7/2021 Jin ....................... H04N 13/351

* cited by examiner

*Primary Examiner* — Nicholas J Lee
(74) *Attorney, Agent, or Firm* — MUNCY, GEISSLER, OLDS & LOWE, P.C.

(57) ABSTRACT

A method of displaying light with the rhythm of music that uses a host system to control display units to display light-emitting colors along with music. The control unit of each display unit controls display elements to operate separately or synchronously. The processor of the host system analyzes the transitions of intro, verse, and hook segments to play the rhythm of the music melody. The host system is used to transmit the display signal to the display units in conjunction with the music to be played, to change various display lighting methods, so as to achieve the effect of displaying light with the rhythm of the music.

2 Claims, 7 Drawing Sheets

METHOD OF DISPLAYING LIGHT WITH THE RHYTHM OF MUSIC

BACKGROUND OF THE INVENTION

1. Field of the Invention

The present invention relates to a method of displaying light with the rhythm of music, especially a transition in which the processor analyzes the intro, verse, and hook passages of the rhythm of the music to be played, so that a plural display elements switch according to different rhythms, display in sequence or synchronously, display with multiple color changes, and display the changes of various lighting methods in multiple colors, so as to achieve the effect of making the device display various lights according to the rhythm of music.

2. Description of the Related Art

With the vigorous development of science and technology, the application of light-emitting devices has become more and more extensive, such as the application of dance halls, nightclub lights, billboards, LED lights around signboards and other facilities or equipment. However, it is no longer easy to meet the needs of modern people when it comes to enjoyment only through visual effects. Therefore, the relevant industry has provided audio equipment that plays music at the same time to meet the needs of modern consumers with the function of light-emitting devices.

However, unless the audio equipment used on the light-emitting device is accurately calculated, it is difficult to release the corresponding music with the corresponding light display. In the application of light-emitting devices and audio equipment, such as adding new songs or changing the order of music, it is also necessary to send another person to calibrate. Therefore, it is often necessary to consume additional manpower, which is the key to the urgent research and improvement for those who are engaged in this industry.

SUMMARY OF THE INVENTION

The present invention has been accomplished under the circumstances in view. It is the main object of the present invention to provide a method of displaying light with the rhythm of music, which uses a host system to control at least one or more display units to display luminous colors along with music. The display unit comprises at least one or more than one board, a plurality of display elements sequentially arranged on the surface of each board, a control unit mounted on each board to control the display elements to operate, and at least one or more signal transmission interfaces located on one side of each board and electrically connected to the control unit on the respective board for transmitting electronic signals. The host system comprises a transmission interface for transmitting electronic signals with the at least one or more signal transmission interfaces of the plurality of display units, a processor electrically connected to the transmission interface, and a signal input unit electrically connected to the processor. The electronic signal is transmitted to at least one or more display units through the host system to achieve the purpose of displaying in sequence or synchronously at least one or more light-emitting modes of color changes in accordance with the music rhythm.

It is another object of the present invention to provide a method of displaying light with the rhythm of music, wherein the processor of the host system selects and controls the display elements to display at least one or more color changes according to a plurality of segments of the music to be played, and transmits display signals to each signal transmission interface of each display unit through the transmission interface of the host system, and after the signal transmission interface of each display unit receives the display signal transmitted by the transmission interface of the host system, the signal transmission interface transmits the display signal to the control unit of the display unit, and then the control unit of each display unit controls each display element at the corresponding position on the respective display unit according to the received display signal, so that the display elements display in sequence or synchronously, and display color changes and a variety of color interlace changes of various lighting modes according to different rhythms, thereby achieving the effect of making the device display various lights with the rhythm of the music.

In order to achieve the above-mentioned purpose and effect, the technical means used in the present invention and its structure, implementation methods, etc., are hereby drawn to illustrate the features and functions of the preferred embodiment of the present invention in detail as follows, so as to be fully understood.

DETAILED DESCRIPTION OF THE PREFERRED EMBODIMENT

Figure 1:
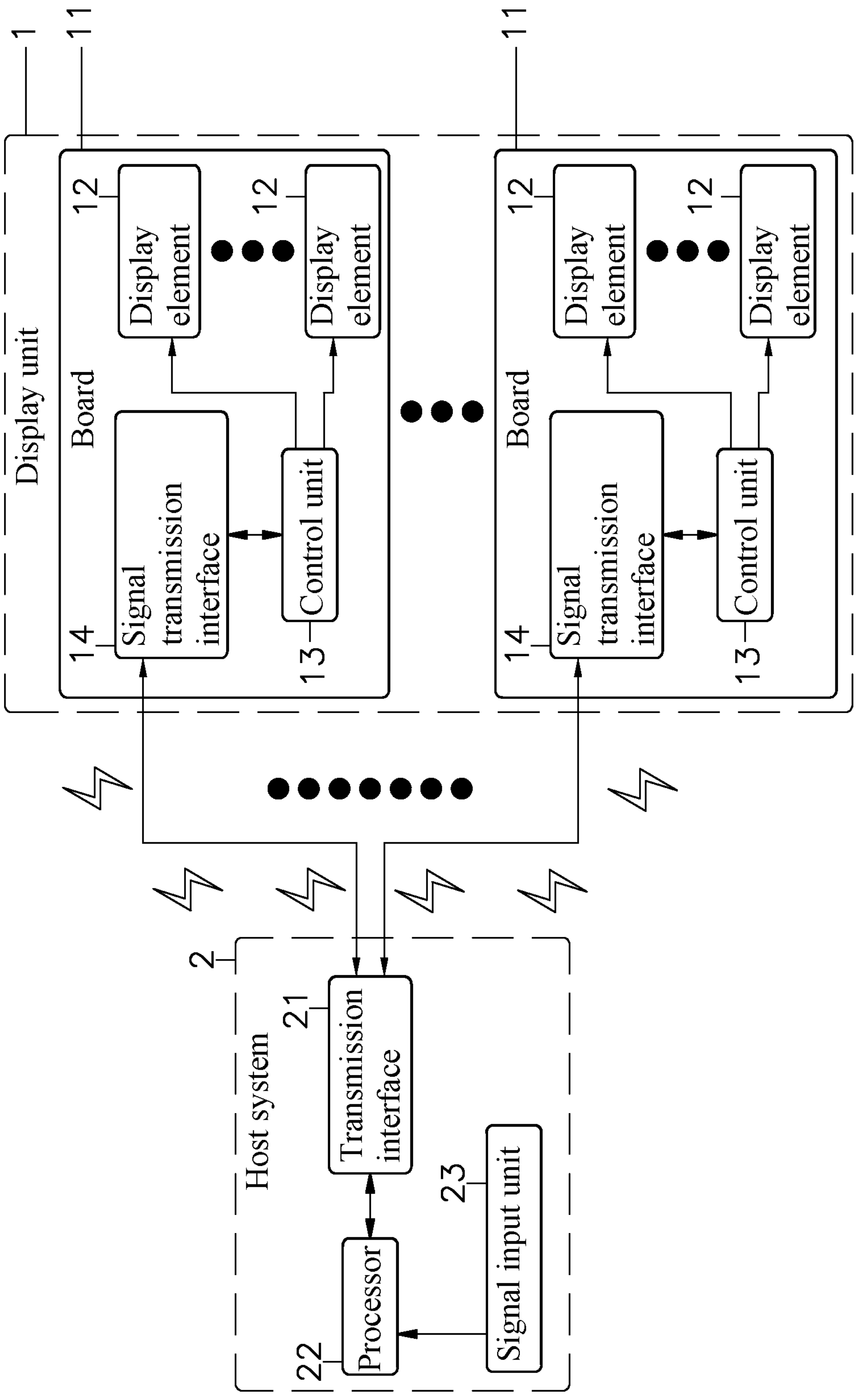
FIG. 1 is a simple block diagram of a method of displaying light with the rhythm of music of the present invention.
Figure 2:
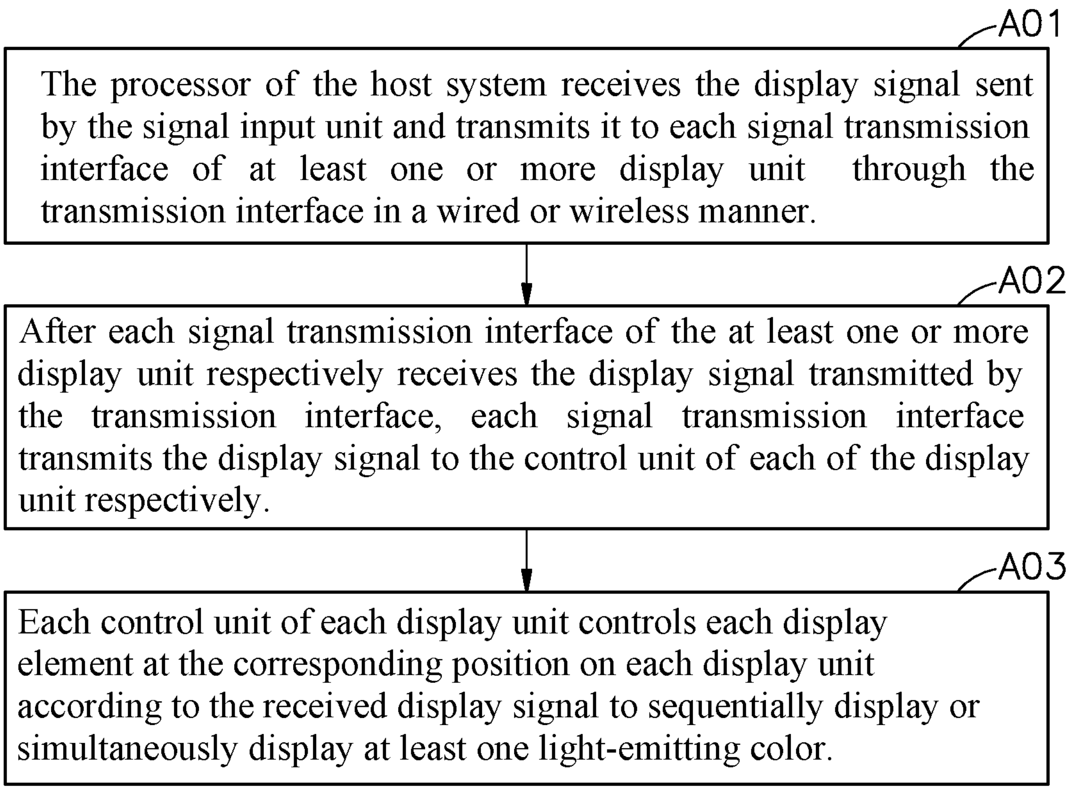
FIG. 2 is a flow chart of the method of displaying light with the rhythm of music of the present invention (I).
Figure 3:
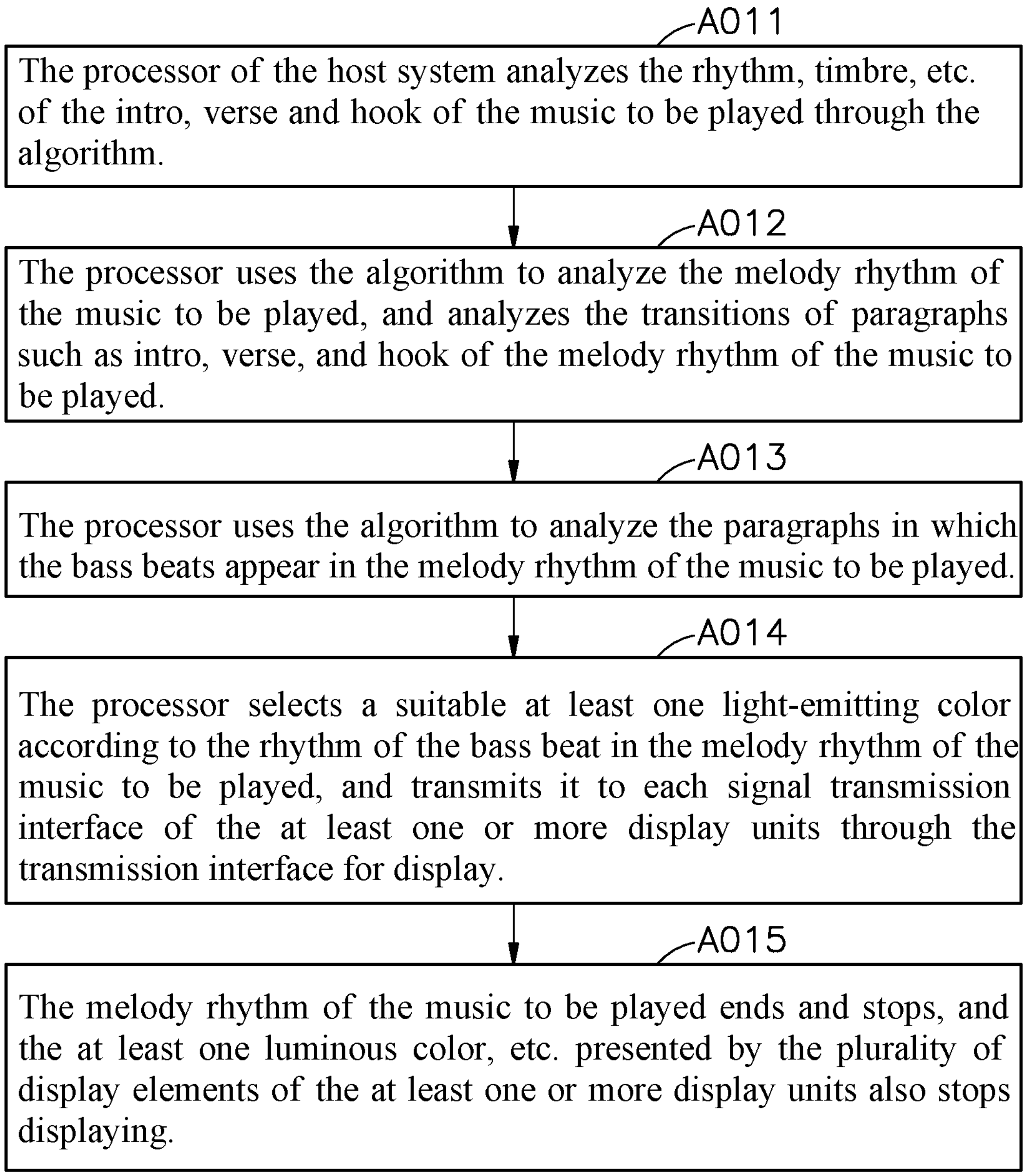
FIG. 3 is a flow chart of the method of displaying light with the rhythm of music of the present invention (II).
Figure 4:
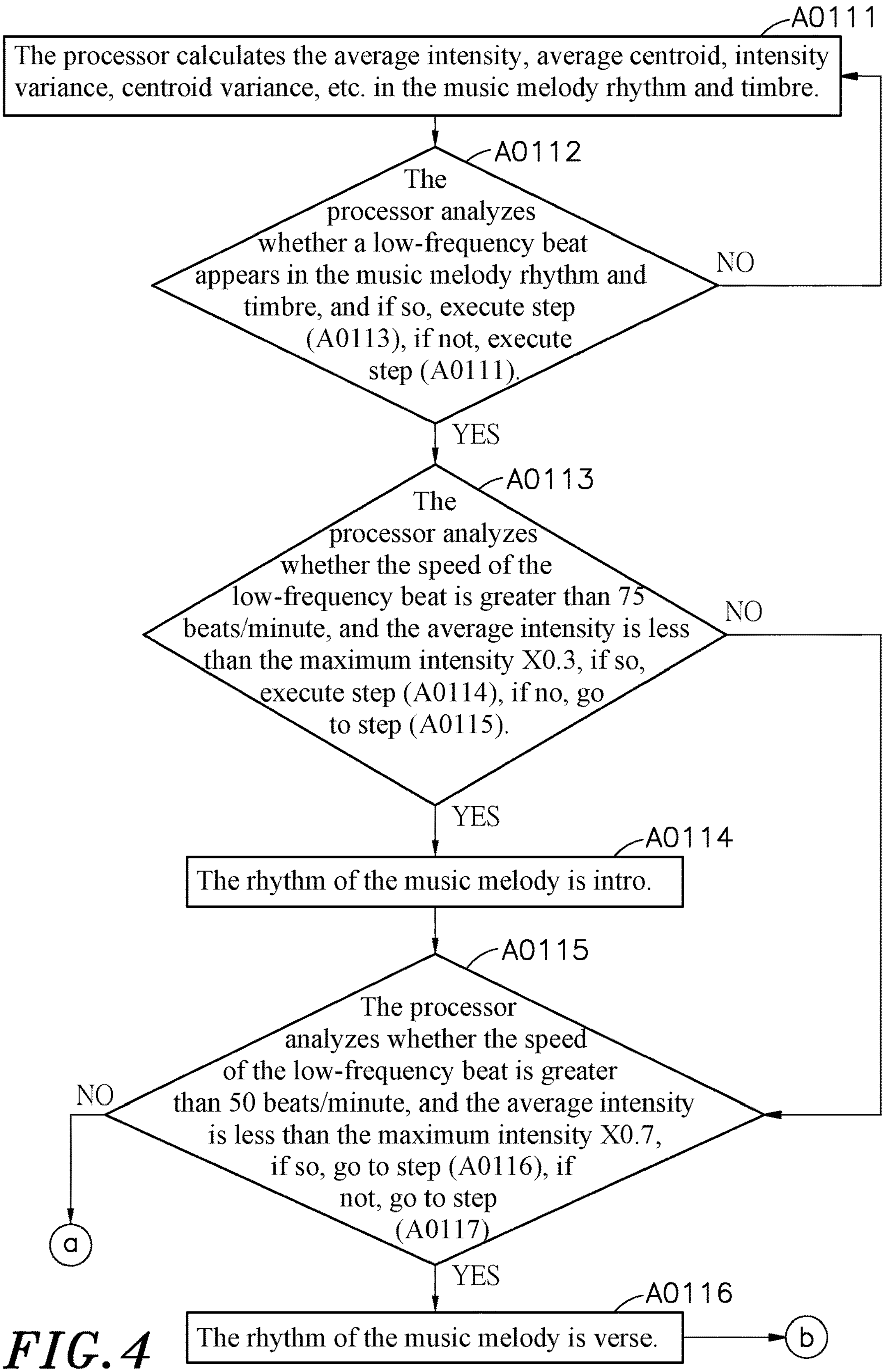
FIG. 4 is a flow chart of the method of displaying light with the rhythm of music of the present invention (III).
Figure 5:
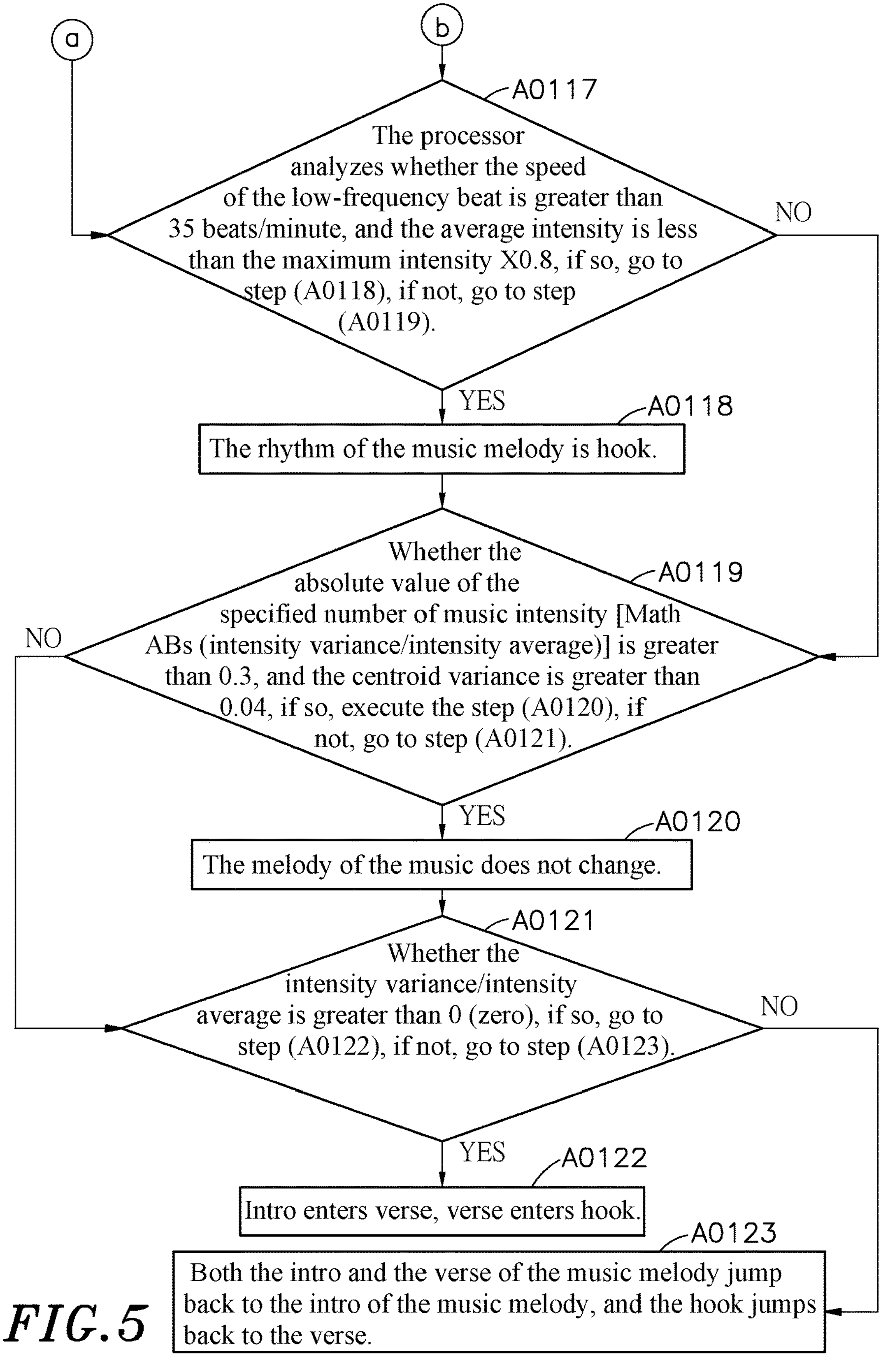
FIG. 5 is a flow chart of the method of displaying light with the rhythm of music of the present invention (IV).
Figure 6:
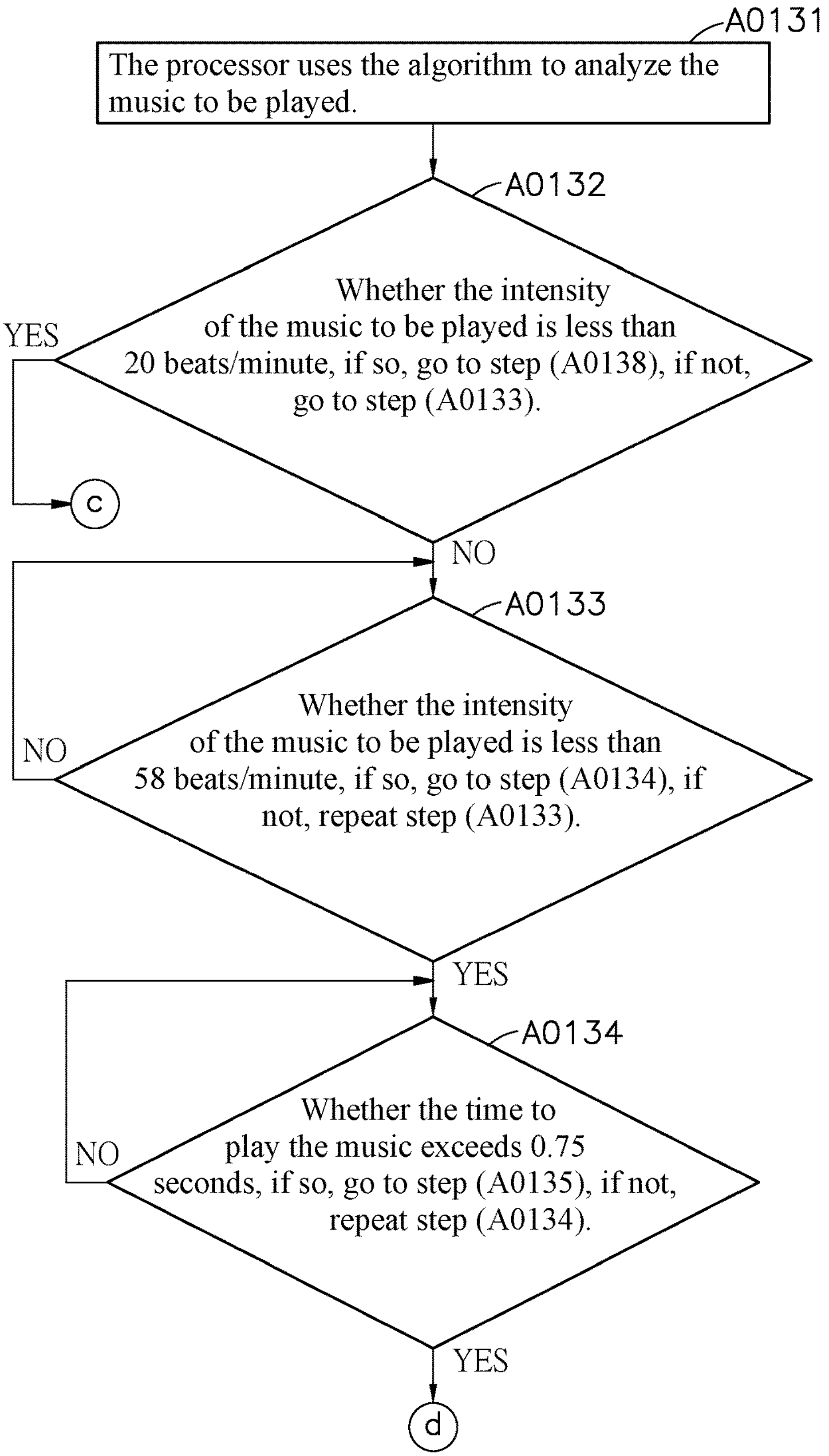
FIG. 6 is a flow chart of the method of displaying light with the rhythm of music of the present invention (V).
Figure 7:
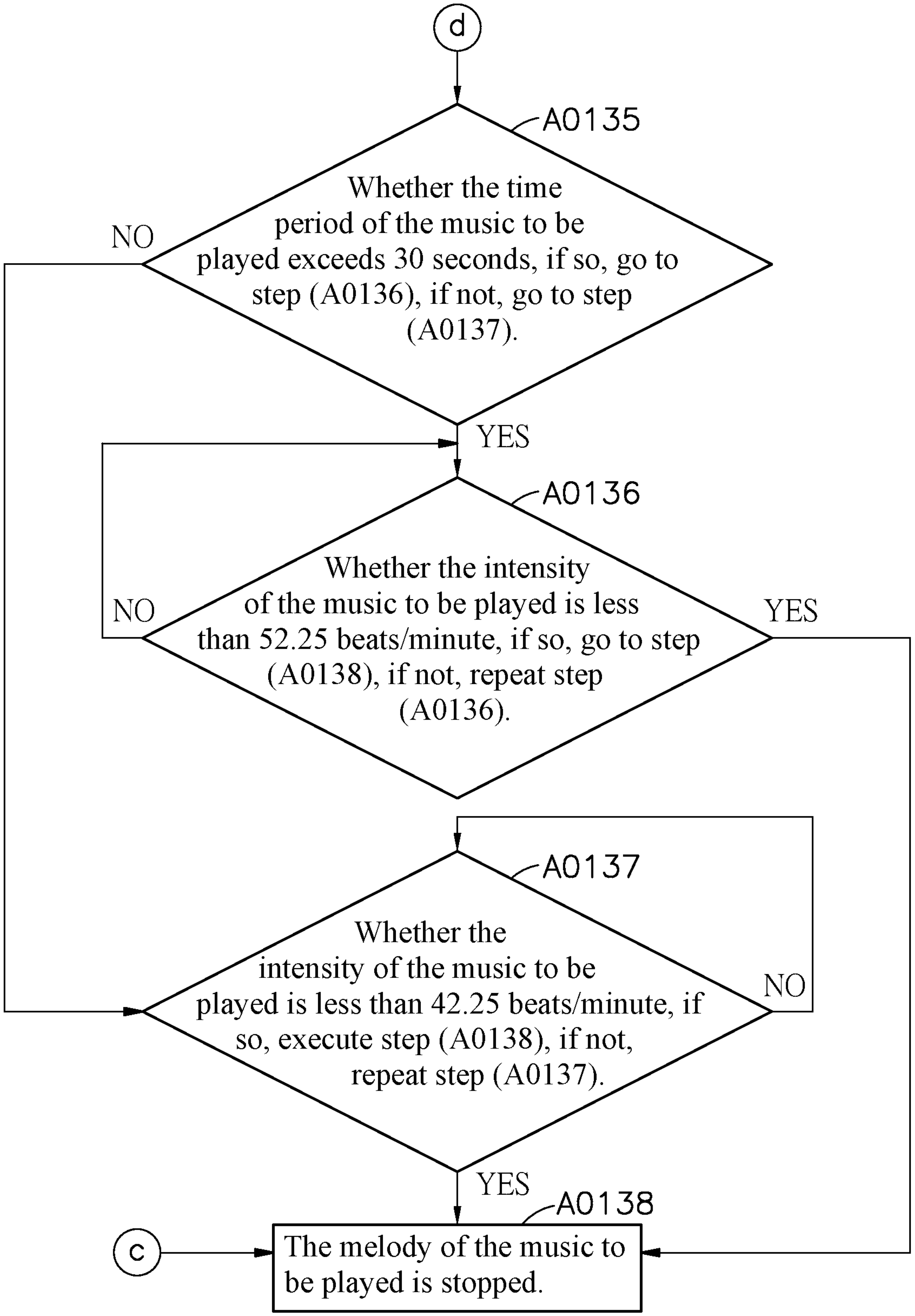
FIG. 7 is a flow chart of the method of displaying light with the rhythm of music of the present invention (VI).

Referring to FIGS. 1-3, the method of displaying light with the rhythm of music of the present invention is the operation of using a host system 2 to control at least one or more display units 1 to display luminous colors along with music. The display unit 1 comprises at least one or more than one board 11, a plurality of display elements 12 sequentially arranged on the surface of each board 11, a control unit 13 mounted on each board 11 to control the display elements 12 to operate, and at least one or more signal transmission interfaces 14 located on one side of each board 11 and electrically connected to the control unit 13 on the respective board 11 for transmitting electronic signals. The host system 2 comprises a transmission interface 21 for transmitting electronic signals with the at least one or more signal transmission interfaces 14 of the plurality of display units 1, a processor 22 electrically connected to the transmission interface 21, and a signal input unit 23 electrically connected to the processor 22. The method of displaying light with the rhythm of music is implemented according to the following steps:

(A01) The processor 22 of the host system 2 receives the display signal sent by the signal input unit 23 and transmits it to each signal transmission interface 14 of at least one or more display unit 1 through the transmission interface 21 in a wired or wireless manner.

(A02) After each signal transmission interface 14 of the at least one or more display unit 1 respectively receives the display signal transmitted by the transmission interface 21, each signal transmission interface 14 transmits the display signal to the control unit 13 of each of the display unit 1 respectively.

(A03) Each control unit 13 of each display unit 1 controls each display element 12 at the corresponding position on each display unit 1 according to the received display signal to sequentially display or simultaneously display at least one light-emitting color.

The above-mentioned at least one or more boards 11 of each display unit 1 respectively use the signal transmission interface 14 to receive the signal transmitted from the transmission interface 21 of the host system 2, so that each display element 12 on the at least one or more than one board 11 respectively sequentially displays at least one or more than one color and other changes, or the same color is displayed sequentially or synchronously, or multiple color changes are displayed, or multiple colors are displayed alternately. In the host system 2 of the above-mentioned step (A01), the processor 22 further selects the music to be played according to the display signal sent by the signal input unit 23, and transmits it to each signal transmission interface 14 of the at least one or more display units 1 through the transmission interface 21. The processor 22 of the host system 2 stores an algorithm internally, and the algorithm can be a Fast Fourier transform. The algorithm can analyze the transition changes of the intro, verse and hook of the music to be played. Then, perform the following steps:

(A011) The processor 22 of the host system 2 analyzes the rhythm, timbre, etc. of the intro, verse and hook of the music to be played through the algorithm.

(A012) The processor 22 uses the algorithm to analyze the melody rhythm of the music to be played, and analyzes the transitions of paragraphs such as intro, verse, and hook of the melody rhythm of the music to be played.

(A013) The processor 22 uses the algorithm to analyze the paragraphs in which the bass beats appear in the melody rhythm of the music to be played.

(A014) The processor 22 selects a suitable at least one light-emitting color according to the rhythm of the bass beat in the melody rhythm of the music to be played, and transmits it to each signal transmission interface 14 of the at least one or more display units 1 through the transmission interface 21 for display.

(A015) The melody rhythm of the music to be played ends and stops, and the at least one luminous color, etc. presented by the plurality of display elements 12 of the at least one or more display units 1 also stops displaying.

The above-mentioned host system 2 can be a computer host or a server, and the at least one or more display units 1 in the host system 2 are provided with speakers, horns or buzzers for playing music.

In the above-mentioned steps (A01)~(A03), the host system 2 can store an algorithm in the processor 22. The algorithm can analyze the transition changes of the intro, verse and hook of the rhythm melody of the music to be played.

Please refer to FIGS. 4, 5, 6, and 7. It can be clearly seen from the figures that in the aforementioned step (A011), the processor 22 of the host system 2 analyzes the melody, rhythm, timbre, etc. of the intro, verse, hook, etc., and in the step (A012), the processor 22 of the host system 2 analyzes the implementation steps of each paragraph conversion of the melody and rhythm of the music to be played, such as intro, verse and hook:

(A0111) The processor 22 calculates the average intensity, average centroid, intensity variance, centroid variance, etc. in the music melody rhythm and timbre.

(A0112) The processor 22 analyzes whether a low-frequency beat appears in the music melody rhythm and timbre, and if so, execute step (A0113), if not, execute step (A0111).

(A0113) The processor 22 analyzes whether the speed of the low-frequency beat is greater than 75 beats/minute, and the average intensity is less than the maximum intensity X0.3, if so, execute step (A0114), if no, go to step (A0115).

(A0114) The rhythm of the music melody is intro.

(A0115) The processor 22 analyzes whether the speed of the low-frequency beat is greater than 50 beats/minute, and the average intensity is less than the maximum intensity X0.7, if so, go to step (A0116), if not, go to step (A0117).

(A0116) The rhythm of the music melody is verse.

(A0117) The processor 22 analyzes whether the speed of the low-frequency beat is greater than 35 beats/minute, and the average intensity is less than the maximum intensity X0.8, if so, go to step (A0118), if not, go to step (A0119).

(A0118) The rhythm of the music melody is hook.

(A0119) Whether the absolute value of the specified number of music intensity [Math ABs (intensity variance/intensity average)] is greater than 0.3, and the centroid variance is greater than 0.04, if so, execute the step (A0120), if not, go to step (A0121).

(A0120) The melody of the music does not change (No Change).

(A0121) Whether the intensity variance/intensity Average is greater than 0 (zero), if so, go to step (A0122), if not, go to step (A0123).

(A0122) intro enters verse, verse enters hook.

(A0123) Both the intro and the verse of the music melody jump back to the intro of the music melody, and the hook jumps back to the verse.

In the above steps, 0.3 of (A0113), 0.7 of (A0115), 0.8 of (A0117), and 0.3, 0.04 of (A0119) are all applied parameter values, and when the sound of music is −3 dB, the music intensity (maximum value) is 87 beats/minute, and the music intensity (minimum value) is −90 dB=0 beats/minute. The aforementioned music intensity can be calculated by the formula based on the sound volume of the music, and the formula is a formula used for general music calculation, which is not disclosed here.

The analysis of music rhythm, melody and timbre of general music is for the analysis of spectrum centroid and bandwidth. The centroid disclosed in the above steps (A0111) and (A0119) is the "Spectrum Centroid".

The formula for calculating the spectrum centroid:

$$[n] = \frac{\sum_{k=1}^{N/2+1}(f[k]\cdot|S_n[k]|)}{\sum_{k=1}^{N/2+1}|S_n[k]|}$$

The formula for calculating the frequency bandwidth:

$$[n] = \frac{\sum_{k=1}^{N/2+1}(f[k]-SC[n])\cdot|S_n[k]|}{N/2+1}$$

In this step (A013), the processor 22 utilizes an algorithm to parse the segment where the bass beat appears in the melody rhythm of the music to be played, and is executed according to the following steps:

(A0131) The processor 22 uses the algorithm to analyze the music to be played.

(A0132) Whether the intensity of the music to be played is less than 20 beats/minute, if so, go to step (A0138), if not, go to step (A0133).

(A0133) Whether the intensity of the music to be played is less than 58 beats/minute, if so, go to step (A0134), if not, repeat step (A0133).

(A0134) Whether the time to play the music exceeds 0.75 seconds, if so, go to step (A0135), if not, repeat step (A0134).

(A0135) Whether the time period of the music to be played exceeds 30 seconds, if so, go to step (A0136), if not, go to step (A0137).

(A0136) Whether the intensity of the music to be played is less than 52.25 beats/minute, if so, go to step (A0138), if not, repeat step (A0136).

(A0137) Whether the intensity of the music to be played is less than 42.25 beats/minute, if so, execute step (A0138), if not, repeat step (A0137).

(A0138) The melody of the music to be played is stopped.

The processor 22 in the above step (A014) uses the built-in algorithm to analyze the intro, verse, interlude, hook and ending in the melody rhythm of the music to be played, and the frequency is high frequency, medium frequency or low frequency. The plurality of display elements 12 are manipulated by different execution programs to display at least one or more than one color change, or the same color is displayed sequentially or synchronously, or a variety of color changes are displayed, or a variety of colors are displayed alternately.

When the above-mentioned host system 2 wants to play music, the processor 22 utilizes an algorithm to analyze the melody of the music rhythm to be played. According to the frequency of intro, verse, interlude, hook and ending in the melody, the frequency of the melody to be played in different sections is high frequency (3000 Hz-16000 Hz), middle frequency (630 Hz-3000 Hz) or low frequency (60 Hz-250 Hz). The processor 22 then selects and controls the plurality of display elements 12 to display at least one or more color changes according to the plurality of segments of the music to be played. According to the segment of the melody to be played, the intro, verse, interlude, hook and ending are equal to the plurality of display elements 12 of the at least one or more boards 11 of the display unit 1, respectively showing one color sequential display or synchronous display, multiple color change display, or multiple color interlaced display.

As for the above-mentioned preferred embodiment of the present invention, when the host system 2 wants to play the intro in the melody passage of the music, the host system 2 transmits electronic signals to each display unit 1 in a wired or wireless manner, then each display element 12 of the at least one or more boards 11 can display at least one or more color changes. When you want to play the verse, interlude, hook, and ending of the paragraph of the music melody, each display element 12 of each board 11 can present one color sequential display or synchronous display, multiple color change display, multiple color staggered display.

Through each display element 12 of each board 11, the melody section of the music rhythm to be played is displayed in different colors of light. When listening to music, it also provides the enjoyment of visual senses, presenting a variety of fun of playing music and the enjoyment of multiple additional modes such as hearing and vision, so as to produce unexpected effects.

What the invention claimed is:

1. A method of displaying light with the rhythm of music that is the operation of using a host system to control at least one display unit to display luminous colors along with music, each said display unit comprising at least one board, a plurality of display elements sequentially arranged on each said board, a control unit mounted on each said board to control said display elements to operate and at least one signal transmission interface located on one side of each said board and electrically connected to the respective said control unit on the respective said board for transmitting electronic signals, said host system comprising a transmission interface for transmitting electronic signals with said signal transmission interfaces of each said display unit, a processor electrically connected to said transmission interface of said host system, and a signal input unit electrically connected to said processor, the method of displaying light with the rhythm of music comprising the steps of:

(A01) said processor of said host system receiving the display signal sent by said signal input unit, and transmitting the display signal to said signal transmission interface located in each said display unit through said transmission interface of said host system, said processor of said host system transmitting display signals to said display elements on each said display unit, so that each said display element displays at least one color change, said processor further selecting the music to be played and transmitting the selected music to said signal transmission interface of each said display unit through said transmission interface of said host system, said processor of said host system having an algorithm stored therein, said algorithm being a Fast Fourier transform, said algorithm being capable of analyzing the music to be played, the transition changes of the intro, verse, and hook in the rhythm and timbre, and then performing the following steps:

(A011) said processor of said host system analyzing the rhythm, timbre of the intro, verse and hook of the music to be played through said algorithm;

(A012) said processor using said algorithm to analyze the melody rhythm of the music to be played, and analyzing the transitions of paragraphs such as intro, verse, and hook of the melody rhythm of the music to be played;

(A013) said processor using said algorithm to analyze the paragraphs in which the bass beats appear in the melody rhythm of the music to be played;

(A014) said processor selecting at least one light-emitting color according to the rhythm of the bass beat in the melody rhythm of the music to be played, and transmitting the selected at least one light-emitting color to said signal transmission interface of each said display unit through said transmission interface of said host system for display, and then executing step (A02);

(A02) after said signal transmission interface of each said display unit received the display signal transmitted by said transmission interface of said host system, said signal transmission interface of each said display unit transmitting the electronic signal to said control unit of the respective said display unit;

(A03) said control unit of each said display unit respectively controlling each said display element at the corresponding position on the respective said display unit according to the received display signals to sequentially display or synchronously display at least one luminous color; and (A04) the melody rhythm of the music to be played being ended and stopped, and the at least one luminous color presented by said display elements of each said display unit also being stopped, wherein in step (A013), said control unit utilizes said algorithm to analyze the segment where the bass beat appears in the melody rhythm of the music to be played, and executes according to the following steps:

(A0131) said processor uses said algorithm to analyze the music to be played;

(A0132) whether the intensity of the music to be played is less than 20 beats/minute, if so, go to step (A0138), if not, go to step (A0133);

(A0133) whether the intensity of the music to be played is less than 58 beats/minute, if so, go to step (A0134), if not, repeat step (A0133);

(A0134) whether the time to play the music exceeds 0.75 seconds, if so, go to step (A0135), if not, repeat step (A0134);

(A0135) whether the time period of the music to be played exceeds 30 seconds, if so, go to step (A0136), if not, go to step (A0137);

(A0136) whether the intensity of the music to be played is less than 52.25 beats/minute, if so, go to step (A0138), if not, repeat step (A0136);

(A0137) whether the intensity of the music to be played is less than 42.25 beats/minute, if so, go to step (A0138), if not, repeat step (A0137); and (A0138) the melody of the music to be played is stopped, and wherein in step (A011), said processor of said host system analyzes the melody, rhythm, timbre, etc. of the intro, verse, hook through said algorithm, and in step (A012), said processor of said host system analyzes each paragraph conversion of the melody and rhythm of the music to be played, such as intro, verse and hook, in the following steps:

(A0111) said processor calculates the average intensity, average centroid, intensity variance, centroid variance in the music melody rhythm and timbre;

(A0112) said processor analyzes whether a low-frequency beat appears in the music melody rhythm and timbre, and if so, execute step (A0113), if not, execute step (A0111);

(A0113) said processor analyzes whether the speed of the low-frequency beat is greater than 75 beats/minute, and the average intensity is less than the maximum intensity X0.3, if so, execute step (A0114), if no, go to step (A0115);

(A0114) the rhythm of the music melody is intro;

(A0115) said processor analyzes whether the speed of the low-frequency beat is greater than 50 beats/minute, and the average intensity is less than the maximum intensity X0.7, if so, go to step (A0116), if not, go to step (A0117);

(A0116) the rhythm of the music melody is verse;

(A0117) said processor analyzes whether the speed of the low-frequency beat is greater than 35 beats/minute, and the average intensity is less than the maximum intensity X0.8, if so, go to step (A0118), if not, go to step (A0119);

(A0118) the rhythm of the music melody is hook;

(A0119) whether the absolute value of the specified number of music intensity [Math ABs (intensity variance/intensity average)] is greater than 0.3, and the centroid variance is greater than 0.04, if so, execute the step (A0120), if not, go to step (A0121);

(A0120) the melody of the music does not change (No Change);

(A0121) whether the intensity variance/intensity average is greater than 0 (zero), if so, go to step (A0122), if not, go to step (A0123);

(A0122) intro enters verse, verse enters hook; and (A0123) both the intro and the verse of the music melody jump back to the intro of the music melody, and the hook jumps back to the verse.

2. The method of displaying light with the rhythm of music as claimed in claim 1, wherein the analysis of music rhythm, melody and timbre of general music is for the analysis of spectrum centroid and bandwidth;

the formula for calculating the spectrum centroid:

$$[n] = \frac{\sum_{k=1}^{N/2+1}(f[k]\cdot|S_n[k]|)}{\sum_{k=1}^{N/2+1}|S_n[k]|}$$

the formula for calculating the frequency bandwidth:

$$[n] = \frac{\sum_{k=1}^{N/2+1}(f[k]-SC[n])\cdot|S_n[k]|}{N/2+1}$$

* * * * *